(12) United States Patent
Honda et al.

(10) Patent No.: US 9,321,487 B2
(45) Date of Patent: Apr. 26, 2016

(54) VEHICLE FRAME STRUCTURE

(71) Applicant: MAZDA MOTOR CORPORATION, Hiroshima (JP)

(72) Inventors: Masanori Honda, Hiroshima (JP); Chikara Kawamura, Hiroshima (JP); Sakayu Terada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/370,274

(22) PCT Filed: Jan. 16, 2013

(86) PCT No.: PCT/JP2013/000151
§ 371 (c)(1),
(2) Date: Jul. 2, 2014

(87) PCT Pub. No.: WO2013/114795
PCT Pub. Date: Aug. 8, 2013

(65) Prior Publication Data
US 2014/0354009 A1   Dec. 4, 2014

(30) Foreign Application Priority Data
Feb. 1, 2012   (JP) .................. 2012-019620

(51) Int. Cl.
*B60N 99/00* (2006.01)
*B62D 25/04* (2006.01)
*B62D 25/00* (2006.01)

(52) U.S. Cl.
CPC ................ *B62D 25/04* (2013.01); *B62D 25/00* (2013.01)

(58) Field of Classification Search
CPC ................................. B62D 25/04; B62D 25/00
USPC ..................................................... 296/187.12
See application file for complete search history.

(56) References Cited

U.S. PATENT DOCUMENTS

| 5,938,275 A * | 8/1999 | Kleinhans .............. B62D 25/02 296/191 |
| 6,702,368 B1 | 3/2004 | Hanyu |
| 7,976,098 B2 | 7/2011 | Nishimura et al. |
| 8,235,458 B2 * | 8/2012 | Mori .................... B62D 21/157 296/193.06 |
| 2008/0143144 A1 | 6/2008 | Yustick et al. |
| 2010/0194146 A1 | 8/2010 | Nishimura et al. |
| 2011/0095567 A1 | 4/2011 | Ishigame et al. |
| 2011/0210581 A1 | 9/2011 | Kunishi et al. |

FOREIGN PATENT DOCUMENTS

| CN | 102202959 A | 9/2011 |
| JP | H10-258768 A | 9/1998 |

(Continued)

OTHER PUBLICATIONS

International Search Report; PCT/JP2013/000151; Apr. 23, 2013.

*Primary Examiner* — Lori L Lyjak
(74) *Attorney, Agent, or Firm* — Studebaker & Brackett PC

(57) ABSTRACT

A frame body (1) has a closed cross-section formed by a first surface (11), a second surface (12) wider than the first surface (11), and two side surfaces (13), and each of the side surfaces (13) has a single bent part (14) or two or more bent parts (14). In the cross-section of the frame body (1), the first surface (11) and an outer part (13a) of the side surface (13) form an angle of approximately 90 degrees or larger than 90 degrees inside the closed cross-section, and a specific bent part which is the single bent part (14) or one of the bent parts (14) closest to the second surface (12) is bent to protrude inward of the closed cross-section.

13 Claims, 9 Drawing Sheets

(56) References Cited

FOREIGN PATENT DOCUMENTS

| JP | 2003-081132 A | 3/2003 |
|----|---------------|--------|
| JP | 2003-205859 A | 7/2003 |
| JP | 2004-130826 A | 4/2004 |
| JP | 2005-178695 A | 7/2005 |
| JP | 2009-286351 A | 12/2009 |
| JP | 2010-173562 A | 8/2010 |
| JP | 2011-088596 A | 5/2011 |
| JP | 2011-251659 A | 12/2011 |

* cited by examiner

FIG.4

| M | −1.01 | 0 | 0.21 | 0.41 | 0.80 | 1.00 | 1.51 |
|---|---|---|---|---|---|---|---|
| Closed cross-section | ⊔ | ⊔ | ⊔ | ⊔ | ⊔ | ⊔ | ⊔ |
| Rate of improvement in Fmax mass efficiency | −14% | 0% | 4% | 9% | 20% | 23% | 10% |

FIG.6

| h/H | 0.42 | 0.49 | 0.55 | 0.62 | 0.69 | 0.75 | 0.82 | 0.89 | 1.00 |
|---|---|---|---|---|---|---|---|---|---|
| Closed cross-section | | | | | | | | | |
| Rate of improvement in Fmax mass efficiency | 8% | 10% | 12% | 18% | 23% | 23% | 22% | 12% | 0% |

FIG.8
| | Test frame body A | Test frame body B | Test frame body C |
|---|---|---|---|
| Bent part | Provided | Provided | Not Provided |
| Bead | Not Provided | Provided | Not Provided |
| Closed cross-section |  |  |  |
| Rate of improvement in Fmax mass efficiency | 23% | 44% | 0% |

FIG. 9

| Bent part | upper | Test frame body D | Test frame body E | Test frame body F |
|---|---|---|---|---|
| | | Protrude inward | Protrude outward | Protrude inward |
| | lower | Protrude inward | Protrude inward | Protrude outward |
| M | upper | 1.0 | 0.25 | 0 |
| | lower | 0.56 | 0.52 | −1.0 |
| h/H | upper | 0.63 | 0.75 | 0.78 |
| | lower | 0.57 | 0.63 | 0.72 |
| Closed cross-section | | | | |
| Rate of improvement in Fmax mass efficiency | | 20% | 24% | 0% |

VEHICLE FRAME STRUCTURE

TECHNICAL FIELD

The present disclosure relates to a vehicle frame structure having a frame body constituting a vehicle body.

BACKGROUND ART

Improved flexural strength has been required for a frame body used particularly for a center pillar of a vehicle body of a vehicle in view of side impact performance of the vehicle. To improve the flexural strength, for example, Patent Document 1 teaches a center pillar including an outer panel positioned outside the vehicle body, an inner panel positioned inside the vehicle body to form a closed cross-section with the outer panel, and a reinforcement arranged between the outer panel and the inner panel.

Patent Document 2 teaches that an outer wall positioned outside the vehicle body is made thicker than a front wall and a rear wall, and a thickness increasing part which is gradually increasing in thickness toward the outside of the vehicle body from a substantial center of the vehicle in a width direction of the vehicle is formed inside the front wall and the rear wall.

Patent Document 3 teaches a vehicle body part which is made of a steel plate, and is substantially in the shape of a rectangular tube with rounded edges, and at least one of the edges and the vicinity thereof is hardened.

CITATION LIST

Patent Documents

Patent Document 1: Japanese Unexamined Patent Publication No. 2003-081132
Patent Document 2: Japanese Unexamined Patent Publication No. 2003-205859
Patent Document 3: Japanese Unexamined Patent Publication No. H10-258768

SUMMARY OF THE INVENTION

Technical Problem

The structure of Patent Document 2 is basically obtained by casting, and cannot easily be applied to a method of manufacturing the panel by press-forming a steel plate, etc. In addition, the structure needs to be thick, which increases the weight of the vehicle body.

The structure of Patent Document 3 requires a hardening step in addition to the pressing step, which increases manufacturing costs.

The structure of Patent Document 1 allows manufacturing of the panel by press-forming at low cost, but is susceptible to improvement in view of weight reduction and improvement in flexural strength of the frame body.

In view of the foregoing, the present disclosure has been achieved. An object of the present disclosure is to provide a lightweight and simple vehicle frame structure which can easily be manufactured by press-forming, and has high strength against flexure of a frame body caused by an externally applied load.

Solution to the Problem

To achieve the object, the present disclosure is directed to a vehicle frame structure including a frame body constituting a vehicle body. The frame body includes a first surface facing outside of the vehicle body, a second surface which is positioned inside the first surface to oppose the first surface and is wider than the first surface, and two side surfaces, one of which connecting one of ends of the first surface in a width direction of the first surface and one of ends of the second surface in a width direction of the second surface, the other connecting the other end of the first surface and the other end of the second surface to form a closed cross-section together with the first surface and the second surface, each of the side surfaces has a single bent part or two or more bent parts which are bent at a midpoint of the first surface and the second surface in a cross-section of the frame body, the first surface and an outer part of the side surface which is positioned closer to the first surface than the single bent part, or is positioned closer to the first surface than one of the bent parts closest to the first surface form an angle of approximately 90 degrees or larger than 90 degrees inside the closed cross-section in the cross-section of the frame body, and a specific bent part which is the single bent part, or one of the bent parts closest to the second surface is bent to protrude inward of the closed cross-section.

When an externally applied load is exerted on a middle part of the first surface in a longitudinal direction of the frame body (an impact load is exerted to bend the frame body so that a middle part of the frame body in the longitudinal direction protrudes inward of the vehicle body relative to the ends of the frame body in the longitudinal direction), a force is exerted in a direction outward of the closed cross-section on an end of the side surface closer to the first surface around the part on which the externally applied load is exerted or a portion near the end, and the end of the side surface closer to the first surface or the portion near the end may locally be buckled by the force. However, according to the above-described configuration, the specific bent part protrudes inward of the closed cross-section, and therefore, a force is exerted in a direction inward of the closed cross-section on the specific bent part to cancel the force in the direction outward of the closed cross-section. Thus, even when a large externally applied load is exerted on the first surface, the local buckling does not easily occur at the end of the side surface closer to the first surface around the part on which the externally applied load is exerted or the portion near the end. Further, when the angle formed by the first surface and the outer part of the side surface inside the closed cross-section is approximately 90 degrees or larger than 90 degrees, the first surface and the side surfaces can easily be formed in one-piece by press-forming, and the flexural strength of the frame body is improved as compared with the case where the bent parts are not formed. The range of approximately 90 degrees includes 90 degrees, and includes a normal margin of error from 90 degrees due to the press-forming.

In the above-described vehicle frame structure, provided that a distance between the first surface and part of the second surface farthest from the first surface measured along a direction perpendicular to the first surface is Ha, and a distance between the specific bent part and the part of the second surface farthest from the first surface measured along the direction perpendicular to the first surface is ha in the cross-section of the frame body, $$0.55 \leq ha/Ha \leq 0.90$$

is preferably satisfied.

Specifically, the flexural strength of the frame body varies depending on the position of the bent part(s) along the direction perpendicular to the first surface. When $0.55 \leq ha/Ha \leq 0.90$ is satisfied, the flexural strength of the frame body can favorably be improved.

In the above-described vehicle frame structure, each of the side surfaces has the single bent part, a first virtual line connecting an end of the side surface closer to the first surface and an end of the side surface closer to the second surface is positioned outside the closed cross-section in the cross-section of the frame body, and provided that a distance between the end of the side surface closer to the first surface and the end of the side surface closer to the second surface measured along the direction perpendicular to the first surface is H, a distance between the single bent part and the end of the side surface closer to the second surface measured along the direction perpendicular to the first surface is h, a distance between the single bent part and a point of intersection of the first virtual line and a second virtual line passing the single bent part and parallel to the first surface is δ, and an acute angle formed by the first virtual line and a line perpendicular to the first surface is θ in the cross-section of the frame body, $$0.5 \leq \delta/(H-h)\tan\theta \leq 1.0$$

is preferably satisfied.

In this configuration, the angle formed by the first surface and the outer part of the side surface inside the closed cross-section is not smaller than 90 degrees, and the flexural strength of the frame body can favorably be improved as compared with the case where the bent parts are not formed.

In the above-described vehicle frame structure, a bead extending in a longitudinal direction of the frame body is preferably formed on at least part of the first surface in the longitudinal direction of the frame body.

With the provision of the bead, the part of the first surface on which the externally applied load is exerted is not easily deformed, and therefore, the local buckling is much less likely to occur at the end of the side surface closer to the first surface around the part on which the externally applied load is exerted or the portion near the end. Thus, the flexural strength of the frame body can further be improved.

In the above-described vehicle frame structure, the frame body preferably constitutes a center pillar of the vehicle body.

When the disclosed vehicle frame structure is applied to the center pillar, side impact performance of the vehicle can be improved by a simple and lightweight configuration.

In the above-described vehicle frame structure, the first surface and the outer part preferably form an angle of approximately 90 degrees inside the closed cross-section in the cross-section of the frame body.

In this configuration, the flexural strength of the frame body can be improved to a maximum degree as compared with the case where the bent parts are not formed.

Advantages of the Invention

As described above, the frame vehicle structure of the present disclosure is lightweight and simple, can easily be manufactured by press-forming, and can improve the strength of the frame body against flexure caused by the externally applied load. Thus, impact performance of the vehicle body can be improved at low cost.

BRIEF DESCRIPTION OF THE DRAWINGS

FIG. 4 is a table showing the shape of a closed cross-section and a rate of improvement in Fmax mass efficiency corresponding to value M.

FIG. 6 is a table showing the shapes of the closed cross-section and the rate of improvement in Fmax mass efficiency corresponding to value h/H.

FIG. 8 is a table showing the shape of the closed cross-section and the rate of improvement in Fmax mass efficiency of the test frame bodies A-C.

FIG. 9 is a table showing the shape of the closed cross-section and the rate of improvement in Fmax mass efficiency of test frame bodies D-E.

DESCRIPTION OF EMBODIMENTS

Embodiments of the present disclosure will be described in detail below.

Figure 1:
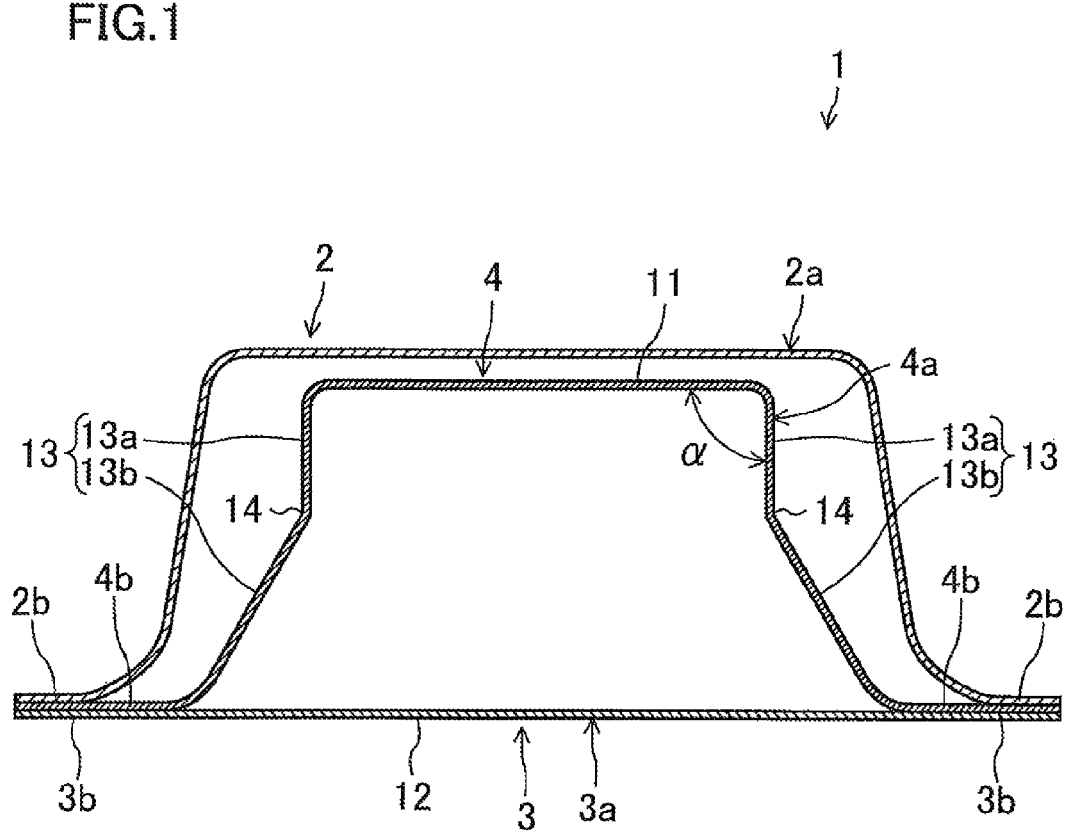
FIG. 1 is a cross-sectional view of a frame body to which a frame vehicle structure of an embodiment of the present disclosure is applied.

FIG. 1 shows a cross-section of a frame body 1 to which the vehicle frame structure of an embodiment of the present disclosure is applied. In this embodiment, the frame body 1 constitutes a center pillar of a vehicle body, and extends in a direction perpendicular to a sheet plane of FIG. 1 (corresponding to a vertical direction of the vehicle when attached to the vehicle body). The vehicle frame structure of the present disclosure may be applied to substantially all part of the center pillar in the vertical direction, or may be applied to part of the center pillar in the vertical direction (e.g., to an upper part of the center pillar to protect particularly an upper body of a passenger).

The frame body 1 includes an outer panel 2 positioned outside the vehicle body, an inner panel 3 positioned inside the vehicle body, and a reinforcement 4 (may be referred to as an outer reinforcement) arranged between the outer panel 2 and the inner panel 3. The outer panel 2 and the inner panel 3 form a closed cross-section, and the inner panel 3 and the reinforcement 4 form another closed cross-section. The outer panel 2 and the reinforcement 4 form still another closed cross-section.

The outer panel 2 includes a body 2a, and flange parts 2b connected to ends of the body 2a in a width direction of the body 2a, respectively. The inner panel 3 includes a body 3a, and flange parts 3b connected to ends of the body 3a in a width direction of the body 3a, respectively. The reinforcement 4 includes a body 4a, and flange parts 4b connected to ends of the body 4a in a width direction of the body 4a, respectively. The outer panel 2, the inner panel 3, and the reinforcement 4 are individually press-formed, and the frame body 1 is obtained by stacking and joining the flange parts 2b, 3b, and 4b after the press-forming.

In this embodiment, the vehicle frame structure of the present disclosure is applied to the inner panel 3 and the reinforcement 4. The outer panel 2 is fundamentally provided in terms of design, and the body 2a covers an outer side of the reinforcement 4. The reinforcement 4 is preferably made of a high-strength steel plate having a tensile strength of 980 MPa or higher, and a thickness of 1.0 mm to 2.5 mm, both inclusive, and is preferably formed by hot press-forming.

The frame body 1 includes a first surface 11 facing outside the vehicle body, a second surface 12 which is positioned inside the first surface 11 to oppose the first surface 11 and is wider than the first surface 11, and two side surfaces 13, one of which connecting one of the ends of the first surface 11 in a width direction of the first surface 11 and one of the ends of the second surface 12 in a width direction of the second surface 12, and the other connecting the other end of the first surface 11 and the other end of the second surface 12 to form a closed cross-section together with the first surface 11 and the second surface 12. The first surface 11 and the two side surfaces 13 are constituted of the body 4a of the reinforcement 4, and the second surface 12 is constituted of the body 3a of the inner panel 3. The second surface 12 and the side surfaces 13 are connected by joining the flange parts 3b of the inner panel 3 and the flange parts 4b of the reinforcement 4. In this embodiment, the second surface 12 (the body 3a) and the two flange parts 3b are positioned on the same straight line, and the first surface 11 is positioned on another straight line parallel to the straight line in the cross-section of the frame body 1.

A bead extending in a longitudinal direction of the frame body 1 is preferably formed on at least part of the first surface 11 in the longitudinal direction of the frame body 1 (e.g., an upper part of the center pillar to protect an upper-body of a passenger). A single bead may be provided on part of the first surface 11 in the width direction of the first surface 11 (e.g., at a substantial center), or two or more beads may be provided on parts of the first surface 11 in the width direction of the first surface 11. The bead may preferably protrude inward of the closed cross-section formed by the first surface 11, the second surface 12, and the side surfaces 13 (hereinafter may simply be referred to as the closed cross-section), or may protrude outward of the closed cross-section.

Each of the side surfaces 13 has a single bent part 14 (corresponding to a specific bent part) which is bent at a midpoint of the first surface 11 and the second surface 12 in the cross-section of the frame body 1. The bent part 14 is bent to protrude inward of the closed cross-section in the cross-section of the frame body 1. The first surface 11 and an outer part 13a of the side surface 13 which is positioned closer to the first surface 11 than the bent part 14 form an angle α of approximately 90 degrees or larger than 90 degrees inside the closed cross-section in the cross-section of the frame body 1. The range of approximately 90 degrees includes 90 degrees, and includes a normal margin of error from 90 degrees due to the press-forming. As long as the angle α is basically not smaller than 90 degrees, the first surface 11 and the two side surfaces 13 can easily be press-formed in one-piece.

In view of the press-forming of the reinforcement 4, corners formed by the first surface 11 and the outer parts 13a of the side surfaces 13 may be rounded in the cross-section of the frame body 1, and corners formed by the flange parts 4b and inner parts 13b of the side surfaces 13 positioned closer to the second surface 12 than the bent parts 14 may be rounded. The outer parts 13a and the inner parts 13b extend linearly in the cross-section of the frame body 1.

When side impact is caused on the vehicle, an externally applied load is exerted on a middle part of the first surface 11 in the longitudinal direction of the frame body 1 (an impact load is exerted to bend the frame body 1 so that a middle part of the frame body 1 in the longitudinal direction protrudes inward of the vehicle body relative to the ends of the frame body in the longitudinal direction) to bend the frame body 1, radii of curvature of the first surface 11 and the second surface 12 differ, and a difference is made between circumferences of the first surface 11 (compressed surface) and the second surface 12 (stretched surface). At this time, a force is exerted to reduce the difference in circumference, and the first surface 11 and the second surface 12 approach each other. When part of the first surface 11 on which the externally applied load is exerted is dented by the externally applied load, the first surface 11 and the second surface 12 approach each other. As a result, a force is exerted on an end of the side surface 13 closer to the first surface 11 around the part on which the externally applied load is exerted or a portion near the end in such a manner that the side surface 13 is bent outward of the closed cross-section using the flange part 4b as a fulcrum (a force is exerted in a direction outward of the closed cross-section), and the end of the side surface 13 closer to the first surface 11 or the portion near the end may locally be buckled (the end of the side surface 13 closer to the first surface 11 or the portion near the end locally bulges outward of the closed cross-section). When this local buckling occurs, flexural strength of the frame body 1 decreases.

In this embodiment, however, the bent part 14 protruding inward of the closed cross-section is provided on each of the side surfaces 13, and a force in a direction inward of the closed cross-section is exerted on the bent part 14 to cancel the force in the direction outward of the closed cross-section. Thus, even when a large externally applied load is exerted on the first surface 11, the local buckling does not easily occur at the end of the side surface 13 closer to the first surface 11 around the part on which the externally applied load is exerted or the portion near the end. This can ensure the strength of the frame body 1 against flexure caused by the externally applied load, thereby improving side impact performance of the vehicle.

When the bead is formed on the first surface 11, and the externally applied load is exerted on the part of the first surface 11 provided with the bead, the part of the first surface 11 on which the externally applied load is exerted is not easily deformed, and therefore, the local buckling is much less likely to occur at the end of the side surface 13 closer to the first surface 11 around the part on which the externally applied load is exerted or the portion near the end.

Figure 2:
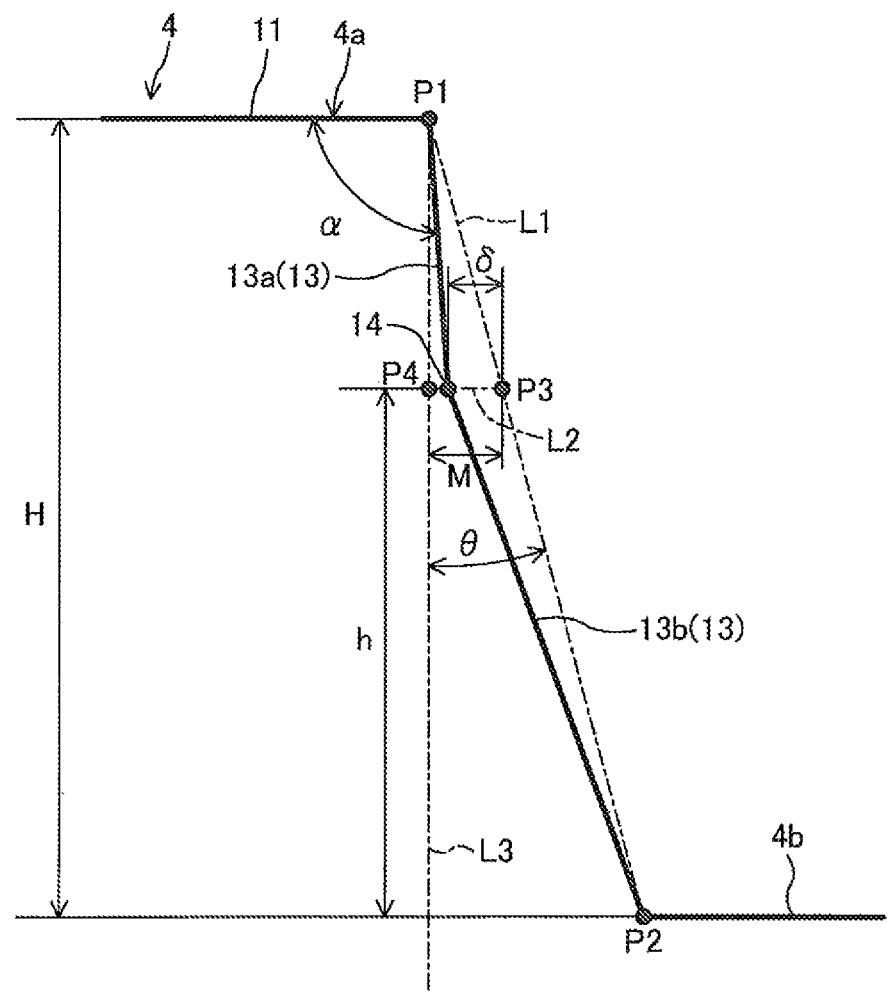
FIG. 2 is an enlargement of a cross-section of a major part of the frame body.
Figure 3:
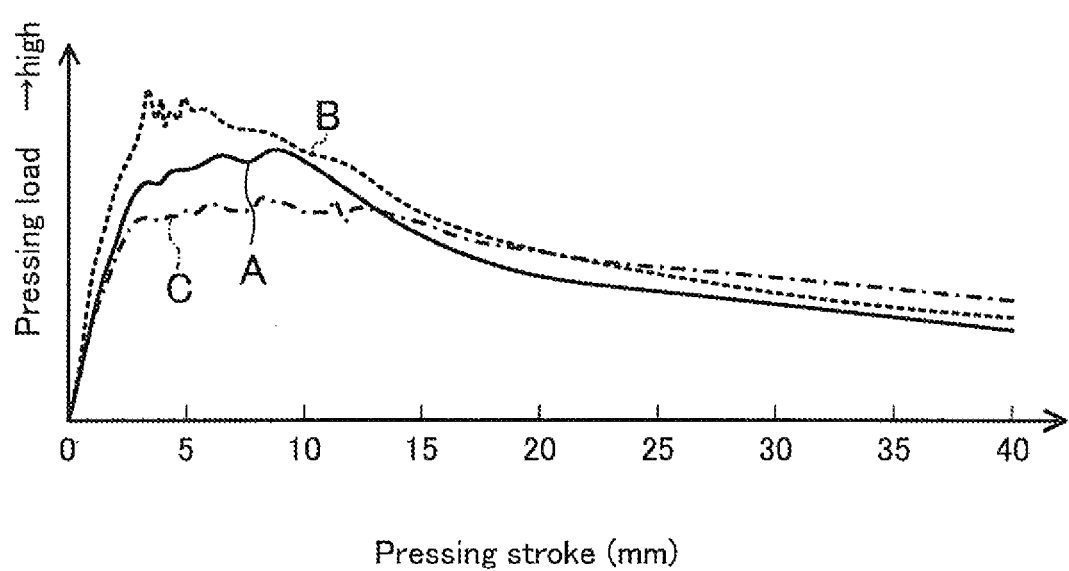
FIG. 3 is a graph showing relationship between pressing stroke and pressing load on test frame bodies A-C.

As shown in FIG. 2, in the cross-section of the frame body 1, a first virtual line L1 connecting an end P1 of the side surface 13 closer to the first surface 11 and an end P2 of the side surface 13 closer to the second surface 12 is positioned outside the closed cross-section. Specifically, the bent part 14 is positioned inside the first virtual line L1 relative to the closed cross-section. The first virtual line L1 corresponds to the side surface 13 on which the bent part 14 is not formed. As shown in FIG. 3, even when the corners formed by the first surface 11 and the outer parts 13a of the side surfaces 13 and the corners formed by the inner parts 13b and the flange parts 4b are rounded, the positions of the ends P1 and P2 are the same as the positions of the ends P1 and P2 when the corners are not rounded.

In the cross-section of the frame body 1, provided that a distance between the end P1 of the side surface 13 closer to the first surface 11 and the end P2 of the side surface 13 closer to the second surface 12 measured along a direction perpendicular to the first surface 11 is H, a distance between the bent part 14 and the end P2 of the side surface 13 closer to the second surface 12 measured along the direction perpendicular to the first surface 11 is h, a distance between the bend part 14 and a point of intersection P3 of the first virtual line L1 and a second virtual line L2 passing the bent part 14 and parallel to the first surface 11 is δ, and an acute angle formed by the first virtual line L1 and a line perpendicular to the first surface 11 (an acute angle formed by the first virtual line L1 and a third virtual line L3 passing the end P1 and perpendicular to the first surface 11) is θ, the inequality $$0.5 \leq \delta/(H-h)\tan\theta \leq 1.0 \quad (1)$$

is preferably satisfied.

More preferably, the inequality $$0.8 \leq \delta/(H-h)\tan\theta \leq 1.0 \quad (2)$$

is satisfied.

In the cross-section of the frame body 1, a distance between the point of intersection P3 and a point of intersection P4 of the second and third virtual lines L2 and L3 is (H−h)tan θ. Thus, value δ/(H−h)tan θ (=M) indicates how the bent part 14 is dented inward of the closed cross-section from P3 in the distance between P3 and P4. When M=0 (δ=0), the bent parts 14 are not formed on the side surfaces 13. When M>0, the bent part 14 protruding inward of the closed cross-section is provided on each of the side surfaces 13. When M=1.0, the bent part 14 is positioned at the point of intersection P4, i.e., the angle α is 90 degrees. Thus, when M≤1.0, the angle α is 90 degrees or larger. Therefore, the value M is preferably larger than 0 and not larger than 1.0. The inequality (1) (particularly the inequality (2)) is preferably satisfied to favorably improve the flexural strength of the frame body 1 as compared with the case where the bent parts 14 are not formed (see FIG. 4 and FIG. 5). In particular, when M=1.0, i.e., the angle α is approximately 90 degrees, the flexural strength of the frame body 1 is improved to a maximum degree (see FIG. 4 and FIG. 5).

In the cross-section of the frame body 1, provided that a distance between the first surface 11 and part of the second surface 12 farthest from the first surface 11 measured along the direction perpendicular to the first surface 11 is Ha (substantially equal to the distance H in this embodiment), and a distance between the bent part 14 (a specific bent part) and part of the second surface 12 farthest from the first surface 11 measured along the direction perpendicular to the first surface 11 is ha (substantially equal to the distance h in this embodiment), the inequality $$0.55 \leq ha/Ha \leq 0.90 \quad (3)$$

is preferably satisfied.

More preferably, the inequality $$0.60 \leq ha/Ha \leq 0.85 \quad (4)$$

is satisfied.

Figure 7:
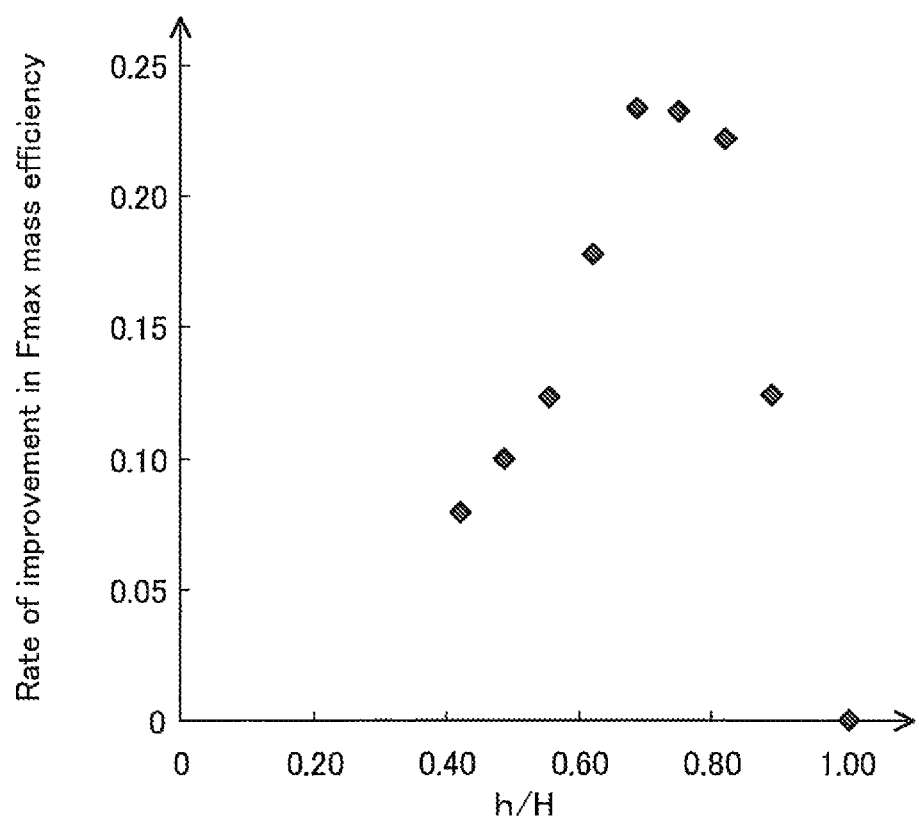
FIG. 7 is a graph showing relationship between the value h/H and the rate of improvement in Fmax mass efficiency.

Specifically, the flexural strength of the frame body 1 varies depending on the position of the bent part 14 along the direction perpendicular to the first surface 11, and the flexural strength of the frame body 1 can favorably be improved when the inequality (3) (particularly the inequality (4)) is satisfied (see FIG. 6 and FIG. 7). The reason why the distances ha and Ha are measured from the part of the second surface 12 farthest from the first surface 11 is that it is considered to be suitable to use the part as a reference because a maximum tensile stress is applied to the part when the frame body 1 is bent by the externally applied load.

FIG. 3 shows the results of a flexure test performed on test frame bodies A and B in which the bent parts 14 are formed on the side surfaces 13 and a test frame body C in which the bent parts 14 are not formed.

The test frame body A is the same as the test frame body shown in FIG. 4 in which M=1.00, and has the bent parts 14 formed on the side surfaces 13, but does not have the bead formed on the first surface 11. The test frame body B is provided by forming the bead on the substantial center of the first surface 11 of the test frame body A in the width direction of the first surface 11 to extend in the longitudinal direction of the test frame body throughout the length of the first surface 11. The bead protrudes inward of the closed cross-section. The test frame body C is the same as the test frame body shown in FIG. 4 in which M=0, and does not have the bent parts 14 formed on the side surfaces 13 (see the closed cross-sections of the test frame bodies A-C shown in FIG. 8). Each of the test frame bodies A-C constitutes the center pillar like the frame body 1, but is not provided with the outer panel 2 (the same is applied to the other test frame bodies described later).

On each of the test frame bodies A-C, an indenter in the shape of a cylindrical column extending in the width direction of the first surface 11 is pressed onto a middle part of the first surface 11 in the longitudinal direction to examine relationship between a pressing stroke of the indenter and a pressing load (a bending load) as the externally applied load. FIG. 3 shows the results.

It is considered that the local buckling occurs when the pressing load is the maximum, and the pressing load does not increase from the maximum value. Specifically, the larger the maximum value of the pressing load (Fmax) is, the higher the flexural strength of the test frame body is. The test frame bodies A and B in which the bent parts 14 are formed on the side surfaces 13 are improved in flexural strength as compared with the test frame body C in which the bent parts 14 are not formed. The test frame body B in which the bead is formed on the first surface 11 is further improved in flexural strength.

Then, the flexure test is performed on various test frame bodies having different values δ (i.e., value M), and a rate of improvement of a value obtained by dividing the maximum value of the pressing load Fmax with a mass of the frame body (hereinafter referred to as Fmax mass efficiency). The rate of improvement in Fmax mass efficiency is evaluated with reference to the Fmax mass efficiency obtained when the bend parts 14 are not formed on the side surfaces 13 (δ=0, i.e., M=0). In this case, h/H (substantially equal to ha/Ha in this embodiment) is fixed to 0.75. Positions of P1 and P2 and the value of the angle θ of the first virtual line L1 are also fixed. The value δ (the value M) obtained when the bent part 14 is positioned inside the first virtual line L1 relative to the closed cross-section is regarded as positive, and the value δ obtained when the bent parts 14 are positioned outside the first virtual line L1 relative to the closed cross-section is regarded as negative. Specifically, when the value δ (M) is negative, the bent parts 14 are bent to protrude outward of the closed cross-section. When the value M exceeds 1, the bent parts 14 are positioned inside the third virtual line L3 relative to the closed cross-section (the angle α is smaller than 90 degrees). The mass of the test frame body does not significantly vary even when the value δ is changed. Thus, the rate of improvement in Fmax mass efficiency is substantially the same as the rate of improvement in Fmax with reference to Fmax obtained when the bent parts 14 are not formed on the side surfaces 13. However, the rate of improvement in Fmax mass efficiency is strictly obtained in view of weight reduction.

Figure 5:
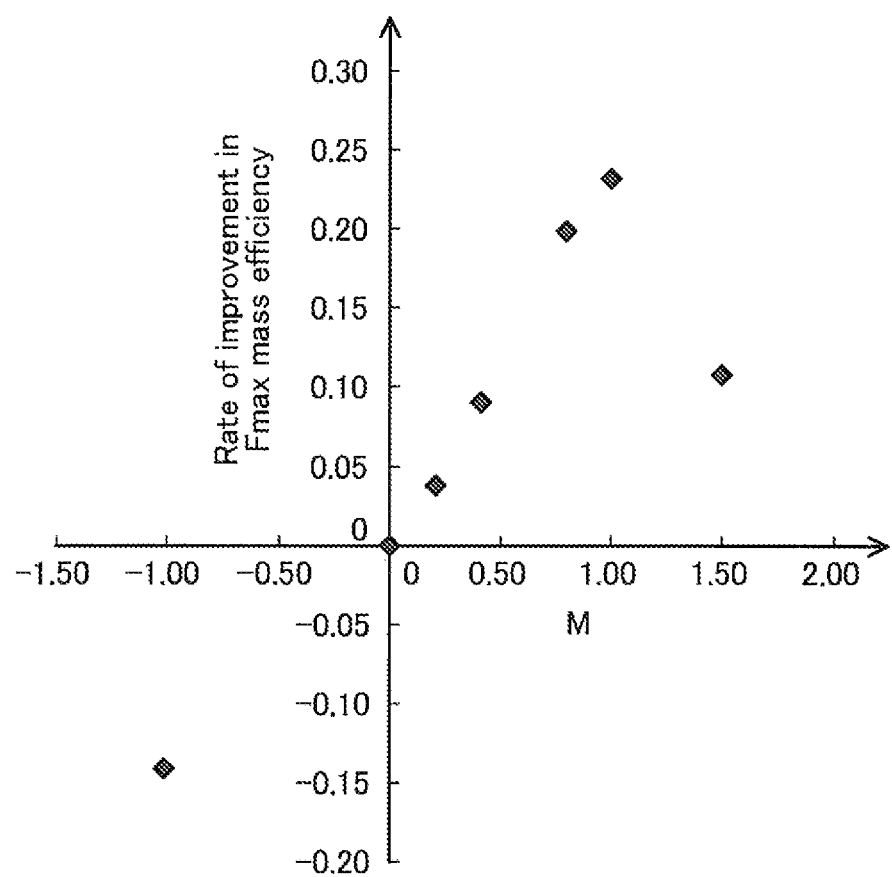
FIG. 5 is a graph showing relationship between the value M and the rate of improvement in Fmax mass efficiency.

FIGS. 4 and 5 show the relationship between the value M and the rate of improvement in Fmax mass efficiency. FIG. 4 also shows the shape of the closed cross-section corresponding to the value M.

As shown in FIG. 5, the Fmax mass efficiency is improved when the value M exceeds 0 (when the bent parts 14 are bent to protrude inward of the closed cross-section), and the Fmax mass efficiency is favorably improved when the value M is 0.5 to 1.0, both inclusive, particularly 0.8 to 1.0, both inclusive. In particular, when M=1.0, i.e., the angle α is approximately 90 degrees, the rate of improvement in Fmax mass efficiency is maximized.

Then, the flexure test is performed on various test frame bodies having different values h/H (can be regarded as the same as the values ha/Ha) to obtain the rate of improvement in Fmax mass efficiency. The rate of improvement in Fmax mass efficiency is evaluated with reference to the Fmax mass efficiency obtained when the bent parts 14 are not formed on the side surfaces 13 (h/H=1.0). The value M is fixed to 1.00 (α=90 degrees). The positions of P1 and P2 and the value of the angle θ of the first virtual line L1 are also fixed. The test frame body shown in FIG. 6 in which h/H=1.00 is the same as the test frame body shown in FIG. 4 in which M=0 (the test frame body in which the bent parts 14 are not formed on the side surfaces 13). It can be said that the value h/H of this test frame body is 0. The test frame body shown in FIG. 6 in which h/H=0.75 is the same as the test frame body shown in FIG. 4 in which M=1.00.

FIGS. 6 and 7 show the relationship between the value h/H and the rate of improvement in Fmax mass efficiency. FIG. 6 also shows the shape of the closed cross-section corresponding to the value h/H.

As shown in FIG. 7, the Fmax mass efficiency is improved when the value h/H is larger than 0 and smaller than 1.00, and the Fmax mass efficiency is favorably improved when the value h/H is 0.55 to 0.90, both inclusive, particularly 0.60 to 0.85, both inclusive. Specifically, the force exerted in the direction outward of the closed cross-section on the end of the side surface 13 closer to the first surface 11 or a part of the side surface 13 near the end can favorably be canceled by suitably determining the positions of the bent parts 14 along the direction perpendicular to the first surface 11.

Subsequently, the rates of improvement in Fmax mass efficiency of the test frame bodies A-C used in the first flexure test (the rate of improvement with reference to the rate of improvement of the test frame body C in which the bent parts 14 are not formed on the side surfaces 13) are obtained. FIG. 8 shows the results. The results and FIG. 2 show the effect of providing the bead on the first surface 11.

In the above-described embodiment, only a single bent part 14 is provided on each of the side surfaces 13. However, two or more bent parts 14 may be provided on each of the side surfaces 13. In such a case, part of each of the side surfaces 13 closer to the first surface 11 than one of the bent parts 14 closest to the first surface 11 is regarded as the outer part 13a. Then, the first surface 11 and the outer part 13a form an angle of approximately 90 degrees or larger than 90 degrees inside the closed cross-section, and one of the bent parts 14 on each of the side surfaces 13 closest to the second surface 12 (corresponding to the specific bent part) is bent to protrude inward of the closed cross-section in the cross-section of the frame body 1. The other bent parts 14 may protrude outward or inward of the closed cross-section. Specifically, the bent part 14 protruding outward of the closed cross-section is present between the end of the side surface 13 closer to the first surface 11 and one of the bent parts 14 closest to the second surface 12 (the specific bent part). Thus, even when the force is exerted in the direction outward of the closed cross-section on the end of the side surface 13 closer to the first surface 11 or the portion near the end, and the force is exerted in the direction outward of the closed cross-section on the bent part 14 protruding outward of the closed cross-section, these forces can be canceled by the force exerted in the direction inward of the closed cross-section on the bent part 14 closest to the second surface 12 (the specific bent part).

Thus, when two or more bent parts 14 are formed on each of the side surfaces 13, the inequality (3) (particularly the inequality (4)) is preferably satisfied in the same manner as the case where the single bent part 14 is formed. In this case, ha is a distance between the bent part 14 closest to the second surface (the specific bent part) and part of the second surface 12 farthest from the first surface 11 measured along the direction perpendicular to the first surface 11.

The flexure test is performed on test frame bodies D-F in which two bent parts 14 are formed on each of the side surfaces 13 to obtain the rates of improvement in Fmax mass efficiency of the test frame bodies D and E with reference to the Fmax mass efficiency of the test frame body F.

In the test frame body D, the upper bent part 14 (closer to the first surface 11) is bent to protrude inward of the closed cross-section, and the lower bent part 14 (closer to the second surface) is also bent to protrude inward of the closed cross-section. In the test frame body E, the upper bent part 14 is bent to protrude outward of the closed cross-section, and the lower bent part 14 is bent to protrude inward of the closed cross-section. In the test frame body F, the upper bent part 14 is bent to protrude inward of the closed cross-section, and the lower bent part 14 is bent to protrude outward of the closed cross-section. The shapes of the cross-sections of the test frame bodies D-F are the same as the shape of the cross-section of the above-described test frame body in which the single bent part 14 is formed except for the shape of the side surfaces 13.

On each of the upper and lower bent parts 14 of the test frame bodies D-F, the values M and h/H are obtained in the same manner as the case where the single bent part 14 is formed. In this case, the first virtual line L1 is the same as the first virtual line L1 obtained in the case where the single bent part 14 is formed. FIG. 9 shows the results and the shape of the closed cross-section (the bent parts 14 are indicated by black dots in the closed cross-section). FIG. 9 also shows the rate of improvement in Fmax mass efficiency of the test frame bodies D and E (with reference to the Fmax mass efficiency of the test frame body F).

The results indicate that the test frame bodies D and E in which at least the lower bent part 14 protrudes inward of the closed cross-section show the greater improvement in Fmax mass efficiency than the test frame body F in which the lower bent part 14 protrudes outward of the closed cross-section.

The present disclosure is not limited to the above-described embodiment, and may be modified within the scope of claims.

For example, the vehicle frame structure of the present disclosure applied to the inner panel 3 and the reinforcement 4 in the above-described embodiment may be applied to the outer panel 2 and the inner panel 3. In this case, the first surface 11 and the side surfaces 13 may be constituted of the body 2a of the outer panel 2, and the reinforcement 4 may be omitted.

The vehicle frame structure of the present disclosure may be applied to other parts than the center pillar, e.g., a bumper reinforcement, a front side frame (especially a kick-up part), a side sill extending in the longitudinal direction of the vehicle at each side of a floor panel in the width direction of the vehicle, a roof rail extending in the longitudinal direction of the vehicle at each side of a roof panel in the width direction of the vehicle, a roof cross member provided on the roof rail to extend in the width direction of the vehicle, a front pillar, a rear side frame, a floor cross member provided on the floor panel to extend in the width direction of the vehicle, etc.

The above-described embodiment is merely illustrative, and should not be construed as limiting the scope of the present disclosure. The scope of the present disclosure is defined by the appended claims, and all changes which come within the meaning and range of equivalency of the claims are intended to be embraced in the scope of the present disclosure.

INDUSTRIAL APPLICABILITY

The present disclosure is useful for a vehicle frame structure having a frame body constituting a vehicle body, particularly for a vehicle frame structure having a frame body constituting a center pillar of the vehicle body.

DESCRIPTION OF REFERENCE CHARACTERS

1 Frame body
2 Outer panel
3 Inner panel
4 Reinforcement
11 First surface
12 Second surface
13 Side surface
14 Bent part

The invention claimed is:

1. A vehicle frame structure, comprising:
a frame body constituting a vehicle body, wherein
the frame body includes a first surface facing outside of the vehicle body, a second surface which is positioned inside the first surface to oppose the first surface and is wider than the first surface, and two side surfaces, one of which connecting one of ends of the first surface in a width direction of the first surface and one of ends of the second surface in a width direction of the second surface, the other connecting the other end of the first surface and the other end of the second surface to form a closed cross-section together with the first surface and the second surface,
each of the side surfaces has a single bent part or two or more bent parts which are bent at a midpoint of the first surface and the second surface in a cross-section of the frame body,
the first surface and an outer part of the side surface which is positioned closer to the first surface than the single bent part, or is positioned closer to the first surface than one of the bent parts closest to the first surface form an angle of approximately 90 degrees or larger than 90 degrees inside the closed cross-section in the cross-section of the frame body,
a specific bent part which is the single bent part, or one of the bent parts closest to the second surface is bent to protrude inward of the closed cross-section, and
when an externally applied load is exerted on a middle part of the first surface in a longitudinal direction of the frame body to bend the frame body in such a manner that a middle part of the frame body protrudes inward of the vehicle body relative to ends of the frame body in the longitudinal direction, a force is exerted on the specific bent part in a direction inward of the closed cross-section to cancel a force exerted in a direction outward of the closed cross-section on an end of the side surface closer to the first surface around the part on which the externally applied load is exerted or a portion near the end, thereby reducing a bulge in the direction outward of the closed cross-section of the end or the portion on which the force in the direction outward of the closed cross-section is exerted.

2. The vehicle frame structure of claim 1, wherein
provided that a distance between the first surface and part of the second surface farthest from the first surface measured along a direction perpendicular to the first surface is Ha, and a distance between the specific bent part and the part of the second surface farthest from the first surface measured along the direction perpendicular to the first surface is ha in the cross-section of the frame body, $$0.55 \leq ha/Ha \leq 0.90$$

is satisfied.

3. The vehicle frame structure of claim 2, wherein
each of the side surfaces has the single bent part,
a first virtual line connecting an end of the side surface closer to the first surface and an end of the side surface closer to the second surface is positioned outside the closed cross-section in the cross-section of the frame body, and
provided that a distance between the end of the side surface closer to the first surface and the end of the side surface closer to the second surface measured along the direction perpendicular to the first surface is H, a distance between the single bent part and the end of the side surface closer to the second surface measured along the direction perpendicular to the first surface is h, a distance between the single bent part and a point of intersection of the first virtual line and a second virtual line passing the single bent part and parallel to the first surface is δ, and an acute angle formed by the first virtual line and a line perpendicular to the first surface is θ in the cross-section of the frame body, $$0.5 \leq \delta/(H-h)\tan\theta \leq 1.0$$

is satisfied.

4. The vehicle frame structure of claim 3, wherein
a bead extending in a longitudinal direction of the frame body is formed on at least part of the first surface in the longitudinal direction of the frame body.

5. The vehicle frame structure of claim 4, wherein
the frame body constitutes a center pillar of the vehicle body.

6. The vehicle frame structure of claim 5, wherein
the first surface and the outer part form an angle of approximately 90 degrees inside the closed cross-section in the cross-section of the frame body.

7. The vehicle frame structure of claim 3, wherein
the frame body constitutes a center pillar of the vehicle body.

8. The vehicle frame structure of claim 4, wherein
the first surface and the outer part form an angle of approximately 90 degrees inside the closed cross-section in the cross-section of the frame body.

9. The vehicle frame structure of claim 1, wherein
each of the side surfaces has the single bent part,
a first virtual line connecting an end of the side surface closer to the first surface and an end of the side surface closer to the second surface is positioned outside the closed cross-section in the cross-section of the frame body, and
provided that a distance between the end of the side surface closer to the first surface and the end of the side surface closer to the second surface measured along the direction perpendicular to the first surface is H, a distance between the single bent part and the end of the side surface closer to the second surface measured along the direction perpendicular to the first surface is h, a distance between the single bent part and a point of intersection of the first virtual line and a second virtual line passing the single bent part and parallel to the first surface is δ, and an acute angle formed by the first virtual line and a line perpendicular to the first surface is θ in the cross-section of the frame body, $0.5 \leq \delta/(H-h)\tan\theta \leq 1.0$ is satisfied.

10. The vehicle frame structure of claim 1, wherein a bead extending in a longitudinal direction of the frame body is formed on at least part of the first surface in the longitudinal direction of the frame body.

11. The vehicle frame structure of claim 10, wherein the frame body constitutes a center pillar of the vehicle body.

12. The vehicle frame structure of claim 1, wherein the frame body constitutes a center pillar of the vehicle body.

13. The vehicle frame structure of claim 1, wherein the first surface and the outer part form an angle of approximately 90 degrees inside the closed cross-section in the cross-section of the frame body.

* * * * *